United States Patent [19]

Barucchi et al.

[11] Patent Number: 5,134,636
[45] Date of Patent: Jul. 28, 1992

[54] SYNCHRONIZATION CIRCUIT FOR A SYNCHRONOUS SWITCHING SYSTEM

[75] Inventors: Gerard Barucchi, Villeneuve Loubet; Jean Calvignac, La Gaude; Jose Galcera, Le Broc; Gilles Toubol; Andre Tracol, both of Villeneuve Loubet; Daniel Orsatti, Cagnes sur Mer, all of France

[73] Assignee: International Business Machines Corporation, Armonk, N.Y.

[21] Appl. No.: 657,906

[22] Filed: Feb. 20, 1991

[30] Foreign Application Priority Data

Mar. 13, 1990 [EP] European Pat. Off. ........ 904800.46.3

[51] Int. Cl.[5] .............................................. H04L 7/00
[52] U.S. Cl. .................................. 375/106; 370/105.1
[58] Field of Search ....................... 375/106, 114, 116; 370/100.1, 105.1, 105.4; 371/42, 46, 69

[56] References Cited

U.S. PATENT DOCUMENTS 4,763,339  8/1988  Sutphin et al. ............... 375/114
4,943,985  7/1990  Gherardi ........................ 375/111
4,984,238  1/1991  Watanabe et al. ........... 370/105.1
5,046,074  9/1991  Abiven et al. ................. 375/114

Primary Examiner—Stephen Chin
Attorney, Agent, or Firm—Joscelyn G. Cockburn

[57] ABSTRACT

The synchronization circuit resynchronizes the data bits received from remote devices on line or link (20-1) with their own clock CS and frame synchronization signal FS with a central clock CO and central frame synchronization signal FO. The received bits are sequentially arranged in an n-bit cyclic buffer (114-1) with the received bit clock CS. The arranged bits are sequentially picked at the opposite buffer position with the central clock CO. The buffer loading position is provided by binary counter 102 incremented by CS and the buffer picking portion is given by binary counter 100 incremented by CO. At initialization counters 102 and 100 are set to 0 and n/2. The resynchronized data bits on line 21-1 and the resynchronized frame signal FSR on line 61-10 are provided to an additional circuit which synchronize the data bits at the frame level.

13 Claims, 4 Drawing Sheets

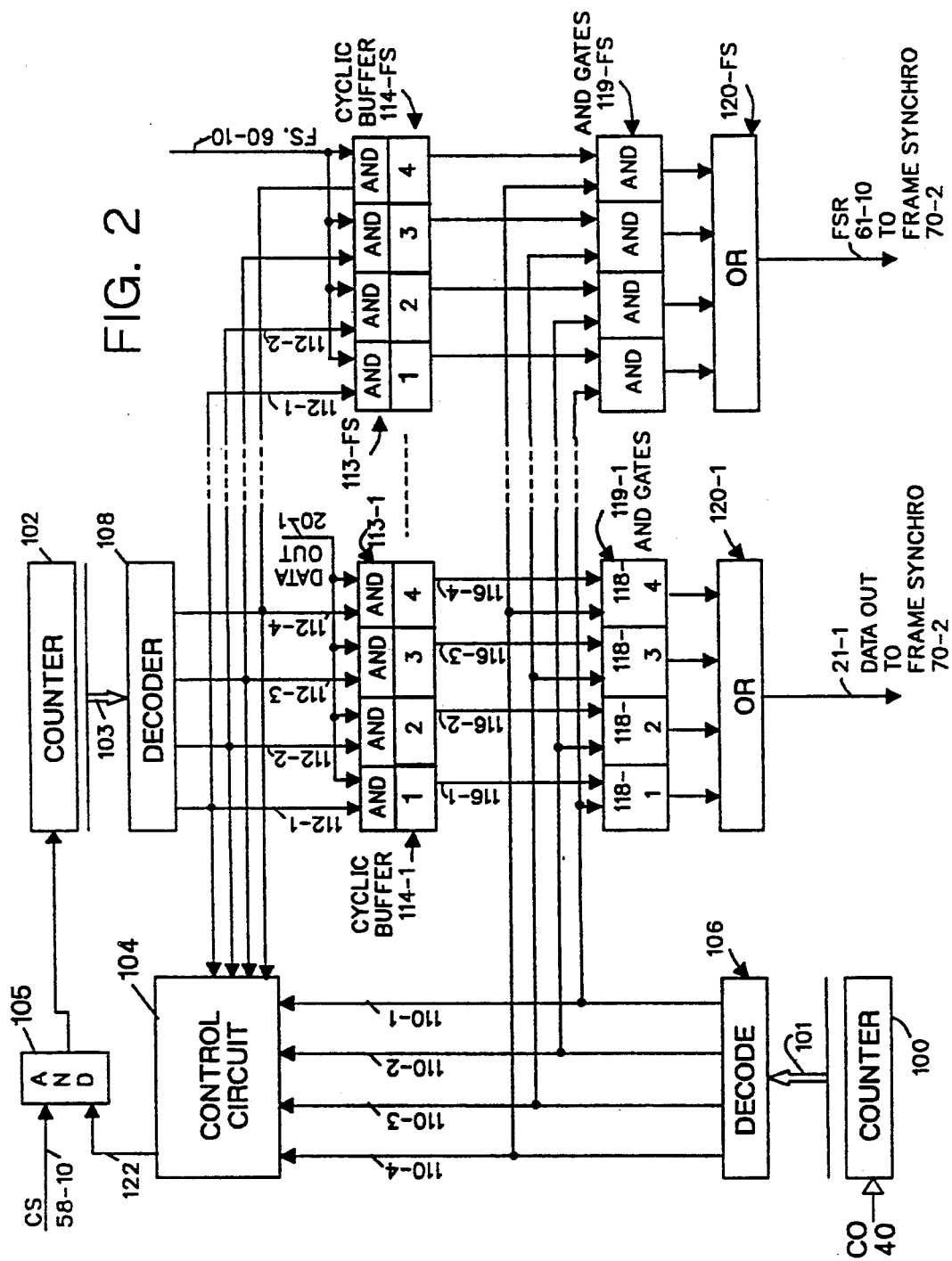

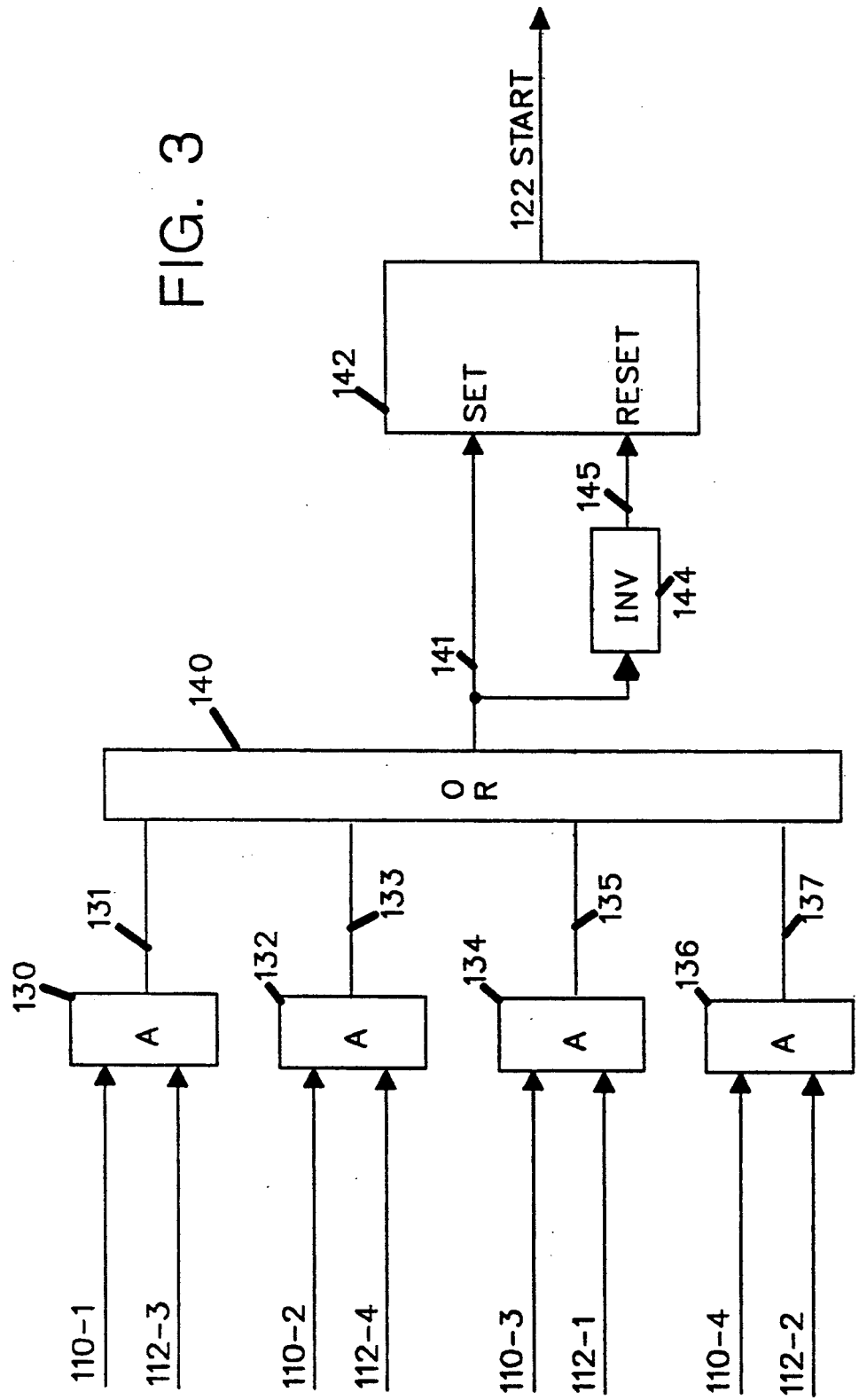

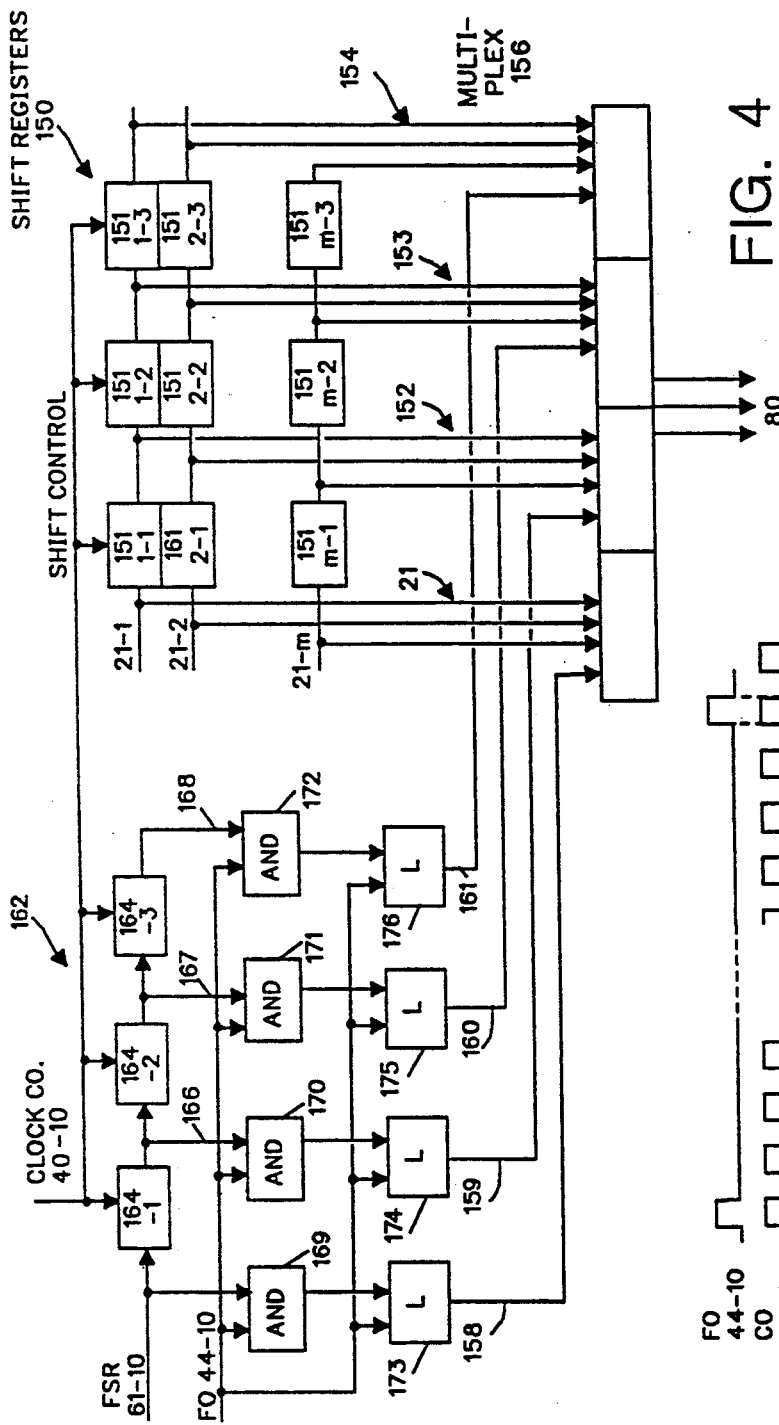

SYNCHRONIZATION CIRCUIT FOR A SYNCHRONOUS SWITCHING SYSTEM

FIELD OF THE INVENTION

The present invention relates to a synchronization circuit which allows the data bits coming from remote devices with their own clock signals to be re-synchronized at the input of a switching system with the system clock signal when the device clock and system clock signals have the same frequency but may be out of phase. The synchronization circuit also allows the data bit frames to be synchronized at the frame level.

BACKGROUND ART

The evolution of synchronous switching systems towards higher connectivity and higher transmission speeds makes it difficult to operate from a central system clock.

In a switching system able to switch data bit frames between devices attached to the switching system through transmission media such as cables or optical fibers having different lengths, the different transmission delays on the different media cause a misalignment of the frames at the input of the switching system, since at high transmission speeds, the transmission delays can reach one or several bit periods. Also the transmission delays depend upon the transmission media and upon the temperature which still increase the misalignment of the frames.

So, the realignment of the frames at the bit level and also at the frame level is necessary if it is desired not to use identical transmission media linking the switching system and the remote devices which can be located at any distance from the system.

Alignment circuits already exist. Most of the conventional techniques required signals having a frequency higher than the bit frequency of the incoming data signal to sample the incoming signal, count the phase differences between the different incoming frames in terms of sample numbers and compensate the so-measured differences.

For example, if F is the frequency of the system clock, the incoming data signals are sampled at a frequency n.F and the counts of the numbers of samples between the incoming signal transitions and the clock transitions are memorized and used to control the shifting of the data bit frames through a shift register to compensate the phase differences.

Such a solution cannot be used when the transmission frequency is too high and reaches a value which is equal to the highest possible sampling frequency.

The article published in the IEEE Journal of Solid State Circuits Vol. 23, No. 2, Apr. 1988 entitled "A 45 Mbits/s CMOS VLSI digital phase aligner" describes a circuit which generates phase compensating information by the sampling of input signal by 0°, 90°, 180° and 270° out of phase clock signals and then by considering the disagreements between the so-obtained samples.

This aligner circuit makes use of complex control logic circuits and only provides for a re-alignment at the bit level and not at the frame level.

SUMMARY OF THE INVENTION

An object of the present invention is to provide a synchronization circuit which receives bits at the frequency of a first clock and automatically re-synchronizes these bits with a second clock signal having any phase relationship with the first clock signal.

Another object of the present invention is to provide such a synchronization circuit which also resynchronizes the bit frames at the frame level.

An object of the present invention is to provide such a circuit which performs a bit and frame resynchronization of the bit frames received at the input of a switching system.

Another object of the present invention is to provide such a circuit which is very simple and cheap.

The synchronization circuit receives data bits on an input line at the frequency of the pulses of a first clock signal (CS) and provides said data bits on a first output line at the frequency of the pulses of a second clock signal (CO) having any phase relationship with the first clock signal. It comprises:

a first counter which counts modulo-n the pulses of the first clock signal CS, n being an integer number at least equal to 2, a second counter which counts modulo-n the pulses of the second clock signal CO, a first buffer having n stages a first gating arrangement responsive to the values reached by the first counter for cyclically gating the received bits for storage in the stages of the first buffer in a first predetermined sequence, the number of the stage into which a received bit is gated being determined by a first relationship established between the numbers of the stages and the values reached by the first counter, a second gating arrangement responsive to the values reached by the second counter for cyclically gating the bits stored in the stages of the first buffer on the first output line in a second predetermined sequence, the number of the stage from which a bit is gated on the output line being determined by a second relationship between the numbers of the stages and the values reached by the second counter, so that the bits are provided on the first output line at the frequency of the pulses of the second clock signal in the same order as they are received.

In a preferred embodiment of the present invention the first and second counters are initially set at values which differ by an integer number x which is equal or higher than n/2 and n is chosen equal to 4. In addition the first relationship is identical to the second relationship.

Furthermore, the synchronization circuit is able to receive the data bits at the frequency of the pulses of the first clock signal in frames delimited by the pulses of a first frame synchronization signal derived from the first clock signal, for providing said data bits on a second output line at the frequency of the second clock signal in frames delimited by the pulses of a second frame synchronization signal which has the same frequency as the first frame synchronization signal but has any phase relationship with said first frame synchronization signal. To perform this synchronization at the frame level the circuit comprises:

a second buffer having n stages, a third gating arrangement responsive to the values reached by the first counter for gating the pulses of the first frame synchronization signal in the stages of the second buffer determined by the first relationship, a fourth gating arrangement responsive to the values reached by the second counting means for gating the pulses stored in the stages of the second buffer determined by the second relationship and thus providing a resynchronized frame signal on a resynchronized frame line, a frame resynchronization circuit connected to the frame resynchronized line and to the first output line and responsive to the second frame synchronization signal for aligning the data bits from the first output line with the second frame synchronization pulses and providing the so-aligned data bits on the second output line.

BRIEF DESCRIPTION OF THE FIGURES

FIG. 2 represents the bit synchronization part of circuit 70-1 shown in FIG. 1.

FIG. 3 represents the control circuit 104 shown in FIG. 2.

FIG. 4 represents the frame synchronization part of circuit 70-1 shown in FIG. 1.

FIG. 5 represents a timing diagram showing the operation of the circuit of FIG. 4.

DETAILED DESCRIPTION OF THE INVENTION

Figure 1:
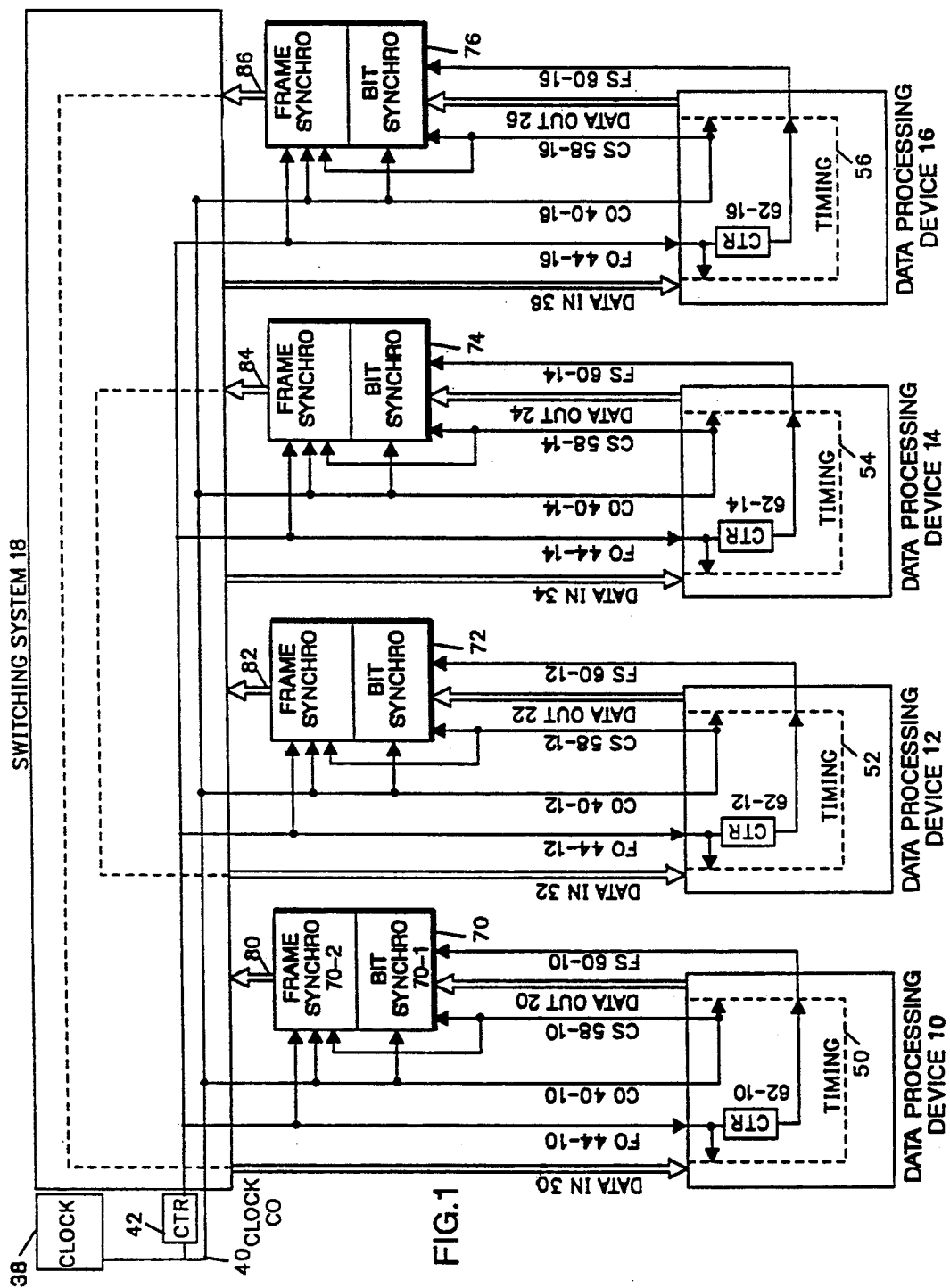
FIG. 1 represents the implementation of the synchronization circuit according to the present invention in a synchronous switching system.

FIG. 1 represents a block diagram of a synchronous switching system incorporating the synchronization circuit according to the subject invention. The data to be exchanged are processed in data processing devices such as 10, 12, 14 and 16. A switching system 18 selects pairs of devices to be connected in order a source device can send data to a target device. The data are provided by each device 10, 12, 14 and 16 through data-out busses 20, 22, 24 and 26, respectively. Each device 10, 12, 14 and 16 receives data through switching system and data in busses 30, 32, 34 and 36 respectively.

In this description, by "data" means any type of binary coded information. Also, only four devices have been represented for the sake of illustration, but any number of devices can be used. The switching system can use any type of switching algorithm.

The data bits are sent on the data in busses 30, 32, 34 and 36 in synchronism with a general system clock signal CO generated by a clock circuit 38 on line 40. This clock signal is distributed to each device through lines 40-10, 40-12, 40-14 and 40-16. Generally, the data bits are arranged into frames delimited by the pulses of a frame synchronization signal. The frame synchronization signal FO provided to the devices 10, 12, 14 and 16 is derived from the clock signal CO by counter 42 so that each frame comprises a fixed integer number of bits.

Each data processing device 10, 12, 14 and 16 comprises a timing circuit 50, 52, 54 and 56, which respectively generates the device clock signal CS on lines 58-10, 58-12, 58-14 and 58-16 and the device frame synchronization signal FS on lines 60-10, 60-12, 60-14 and 60-16 from the clock signal CO and the frame synchronization signal FO received from line 40 and 44. The clock signal CS has the same frequency as the clock signal CO, their phase differences result from the distance between the switching system and the data processing devices. Also, the frame synchronization signal FS has the same frequency as signal FO but is advanced with respect to frame synchronization signal FO through counters 62-10, 62-12, 62-14 and 62-16 in order to anticipate the delay taken in the data upstream from the adapter to the switch.

In such a system, there is a need to resynchronize the data received by the switching system 18 from busses 20, 22, 24 or 26 with the system clock signal CO and frame synchronization signal FO in order to switch this data on the busses 30, 32, 34 or 36 as schematically shown by the dotted lines inside the switching system.

This is the function of circuits 70, 72, 74 and 76 which receive the data from data-out busses 20, 22, 24 and 26 respectively, the clock signals CS and CO, the frame synchronization signals FS and FO to provide on their output busses 80, 82, 84 and 86 the resynchronized data at the input of the switching system 18.

These circuits 70, 72, 74 and 76 comprise two stages referenced as 70-1 and 70-2, 72-1 and 72-2, 74-1 and 74-2 and 76-1 and 76-2 respectively, the first stage processes the phase differences at the bit level and the second stage processes the phase differences at the frame level.

FIG. 2 shows a detailed representation of the first stage 70-1 in circuit 70. The other stages 72-1, 74-1 and 76-1 are identical to stage 70-1.

This first stage comprises two counters 100 and 102. In a preferred embodiment of the invention, the counters are initially set at different values through a control circuit 104. The counters 100 and 102 are modulo-n counter and counts the pulses of the signals CO and CS respectively. The initial value of the counter 100 is 0 and the initial value of the counter 102 is the integer number which is equal or higher than n/2, with n higher than 2 and preferably equal to 4.

The initial values are set through control circuit 104 and AND gate 105 which prevents the clock pulses CS from being provided to counter 102 before a start pulse is generated by circuit 104, to establish the initial values of counter 100 and 102 as will be described later on.

Decoding circuits 106 and 108 are responsive to the values reached by counters 100 and 102 received from busses 101 and 103 respectively, to activate one of their four output lines depending upon the counter values.

Decoding circuit 106 has four output lines 110-1, 110-2, 110-3 and 110-4 activated when the counter values are 1, 2, 3 and 4 respectively.

Decoding circuit 108 has four output lines 112-1, 112-2, 112-3 and 112-4 activated when the counter values are 1, 2, 3 and 4 respectively.

Data-out bus 20 is a parallel bus able to carry m bits and comprises m lines 20-1 to 20-m. Each line 20-i (with $1 < i < m$) of the bus is provided to the inputs of a four-stage cyclic buffer 114-i through AND gate arrangement 113-1 so that at each bit time of the clock signal CS, the bit on line 20-i is gated in one stage of cyclic buffer 114-i depending upon the value reached by counter 102.

In FIG. 2, cyclic buffer 114-1 and gating arrangement 113-1, 119-1, 120-1 for data-out line 20-1 are shown. An identical arrangement exists for resynchronizing the FS signal received from line 60-10 with the clock signal CO. It comprises cyclic buffer 114-FS, AND gate arrangements 113-FS and 119-FS and OR gate arrangement 120-FS which provides a resynchronized FS signal FSR on its output line 61-10.

Only the assembly of cyclic buffer 114-1, AND gate arrangements 113-1 and 119-1 and OR gate arrangement 120-1 will be described in detail. Each stage of cyclic buffer 114-1 has an output line 116-1, 116-2 116-3 and 116-4, each one being provided to one input of an AND gate 118-1, 118-2, 118-3 and 118-4 in AND gate arrangement 119-1.

AND gate 118-1 is conditioned by an active signal on output line 110-1 of decoding circuit 106, AND gate 118-2 is conditioned by an active signal on output line 110-2, AND gate 118-3 is conditioned by an active signal on output line 110-3 and AND gate 118-4 is conditioned by an active signal on output line 110-4.

The output lines of the four AND gates 118-1 to 118-4 are provided to the inputs of OR gate 120-1, the output line of which constitutes one line 21-1 among the m data out lines 21-1 to 21-m which are provided to the frame synchronization part 70-2.

The counter 102 and decoding circuit 108 allow the data bits received on line 20-1 in synchronism with the clock signal CS to be arranged sequentially in one stage of the cyclic buffer in accordance with the value reached by the counter. The counter 100 and decoding circuit 106 allow the data bits stored in cyclic buffer to be gated on line 21-1 in synchronism with the system clock signal CO, as explained in the table below.

The counters 100 and 102, decoding circuits 106 and 108 and control circuit 104 are common for the control of the cyclic buffers 114-1 to 114-m and 114-FS.

There exists a fixed relationship between the number of the cyclic buffer stage into which a bit is written and the value reached by the counter 102 and there exists a fixed relationship between the cyclic buffer stage from which a bit is read and the value reached by the counter 100. These relationships have to be established so that the bits are read in the same sequence as they are written. Any relationships can be established. In a preferred embodiment of the present invention, since the counters 100 and 102 are set at different initial values, the relationship between the values reached by counter 102 and the stage number into which a bit is written is identical to the relationship between the value reached by the counter 100 and the stage number from which a bit is read as shown in the following table.

| Counter 102 | Counter 100 | write into buffer 114 | read from of buffer 114 |
|---|---|---|---|
| 1 | 3 | x = 1 | y = 3 |
| 2 | 4 | x = 2 | y = 4 |
| 3 | 1 | x = 3 | y = 1 |
| 4 | 2 | x = 4 | y = 2 |

Control circuit 104 is responsive to the counter values at the outputs of decode circuits 106 and 108 to generate on its output line 122 a START/STOP signal which is provided to one input of AND gate 105 to prevent the clock signal CS from being applied to the counter as long as a start condition is not set. The only possible start conditions are the following:

| COUNTER 102 | 1 | 2 | 3 | 4 |
|---|---|---|---|---|
| COUNTER 100 | 3 | 4 | 1 | 2 |

As shown in FIG. 3, control circuit 104 comprises a compare circuit made of AND gates 130, 132, 134 and 136.

AND gate 130 is connected to lines 110-1 and 112-3 and thus provides an active signal on its output line 131 when the values in counters 100 and 102 are 1 and 3 simultaneously.

AND gate 132 is connected to lines 110-2 and 112-4 and thus provides an active signal on its output line 133 when the values in counters 100 and 102 are 2 and 4 simultaneously.

AND gate 134 is connected to lines 110-3 and 112-1 and thus provides an active signal on its output line 135 when the values in counters 100 and 102 are 3 and 1 simultaneously.

AND gate 136 is connected to lines 110-4 and 112-2 and thus provides an active signal on its output line 137 when the values in counters 100 and 102 are 4 and 2 simultaneously.

The output lines 131, 133, 135 and 137 are provided to the inputs of OR gate 140 the output line of which is provided to the set input of latch 142. Line 141 is provided to inverter 144, the output line 145 of which is provided to the reset input of latch 142. The output line 122 is activated when latch 142 is set. i.e when a START condition exists. Thus the clock signal CS is not provided to counter 102 before counter 100 reaches a value which favorably compares with the value in counter 102.

The frame synchronization part 70-2 of circuit 70 is shown in FIG. 4. The output lines 21-1 to 21-m from part 70-1 are provided to a shift register arrangement 150.

The shift register arrangement 150 comprises m shift registers 151-1 to 151-m having p stages. p is chosen as a function of the largest phase difference between frame synchronization signals FO and FS. In a preferred embodiment of the invention, p is chosen equal to 3. Each stage is referenced by the reference number 151 followed by a suffix indicating the shift register number and the stage number, for example 151 m-2 references the second stage of shift register 151-m. Each data line 21-1 to 21-m is provided to the input of a shift register 151-1 to 151-m respectively, so that the data bits resynchronized with the clock signal CO are shifted in the shift registers 151-1 to 151-m under control of the clock signal CO.

The data bits from line 21-1 to 21-m and the delayed data bits from outputs 152, 153 and 154 of each stage of shift registers 151-1 to 151-m are provided to a multiplex arrangement 156 which gates the data bits from a selected bus 21, 152, 153 or 154 onto bus 80 under control of a gating signal on one line 158, 159, 160 or 161 respectively.

The gating control signals are generated from the resynchronized FSR signal from line 61-10 through control circuit 162.

This circuit comprises a shift register 164 having p=3 stages 164-1, 164-2 and 164-3, controlled by the clock signal on line 40-10. Signal FSR on line 61-10 is provided to the input of first stage 164-1.

Line 61-10 and the output lines 166, 167, 168 and each stage 164-1, 164-2 and 164-3 are provided to first inputs of AND gates 169, 170, 171 and 172 respectively. The second inputs of these AND gates are connected to line 44-10, so that they receive the frame synchronization signal FO. Since the signal FSR is resynchronized at the bit level, as shown in the timing diagram of FIG. 5, one gate among AND gates 169 to 172 detects a coincidence between the synchronization pulse of signal FO and either the resynchronized pulse of signal FSR on line 61-10 or the delayed pulses on line 166, 167 or 168.

The output lines of AND gates 169, 170, 171 and 172 are provided to the set input of latches 173, 174, 175 and 176, the reset inputs of which are connected to line 44-10.

Thus, latches 173 to 176 are reset at the beginning of each frame period and then only one latch is set during the frame period depending upon which AND gate 169 to 172 detects a coincidence. For example, as shown in the timing diagram of FIG. 5, AND gate 170 detects the coincidence and latch 174 is set and generates an active gating signal on its output line 159 to gate the delayed data bits on bus 152 to bus 80.

At the next active pulse of signal FO, latch 174 is reset and the gating signal is generated by one latch among latches 173 to 176 depending upon which AND gates 169 to 172 detects the coincidence.

Thus the data bits on bus 80 are resynchronized at the bit level and frame level and can be switched on a selected one data-in bus 30, 32, 34 or 36.

We claim:

1. A synchronization circuit receiving data bits on an input line or link (20-1) at the frequency of the pulses of a first clock signal (CS) and providing said data bits on a first output line or link (21-1) at the frequency of the pulses of a second clock signal (CO) having any phase relationship with the first clock signal, characterized in that it comprises:
   first counting means (102) which counts modulo-n the pulses of the first clock signal, n being an integer number at least equal to 2,
   second counting means (100) which counts modulo-n the pulses of the second clock signal,
   a first buffering means (114-1) having n stages
   first gating means (113-1) responsive to the values reached by the first counting means for cyclically gating the received bits for storage in the stages of the first buffering means in a first predetermined sequence, the number of the stage into which a received bit is gated being determined by a first relationship established between the numbers of the stages and the values reached by the first counting means,
   second gating means (119-1, 120-1) responsive to the values reached by the second counting means for cyclically gating the bits stored in the stages of the first buffering means on the first output line in a second predetermined sequence, the number of the stage from which a bit is gated on the output line being determined by a second relationship between the numbers of the stages and the values reached by the second counting means, so that the bits are provided on the first output line at the frequency of the pulses of the second clock signal in the same order they are received.

2. A synchronization circuit according to claim 1, characterized in that the first and second counting means are initially set at values which differ by an integer number x which is equal or higher than n/2.

3. A synchronization circuit according to claim 2, characterized in that n is equal to 4.

4. A synchronization circuit according to claim 2 or 3, characterized in that the first and second relationships are identical.

5. A synchronization circuit according to claim 1 further including a frame synchronizing means for receiving bits on the first output line (21-1) packaged into frames delimited by pulses of a first frame synchronization signal and for providing said data bits on a second output line (80) packaged into frames delimited by pulses of a second frame synchronization signal.

6. The synchronization circuit of claim 5 wherein the bits on the first output line are being received at the frequency of the first clock signal.

7. The synchronization circuit of claim 6 wherein the first frame synchronization signal is being derived from the first clock signal.

8. The synchronization circuit of claim 7 wherein the bits on the second output lone (80) are provided at the frequency of the second clock signal.

9. The synchronization circuit of claim 8 wherein the frequency of the first frame synchronization signal and second frame synchronization signal are the same.

10. The synchronization circuit of claim 5 wherein the frame synchronization include a second buffering means (114-FS) having n stages,
    third gating means (113-FS) responsive to the values reached by the first counting means for gating the pulses of the first frame synchronization signal in the stages of the second buffer determined by the first relationship, and
    fourth gating means (119-FS, 120-FS) responsive to the values reached by the second counting means for gating the pulses stored in the stages of the second buffering means determined by the second relationship and thus providing a resynchronized frame signal on a resynchronized frame line (61-10).

11. The synchronization circuitry of claim 10 wherein the frame synchronization means further includes a frame resynchronization circuit (150, 162) connected to the frame resynchronized line and to the first output line and responsive to the second frame synchronization signal for aligning the data bits from the first output line with the second frame synchronization pulses and provided the so-aligned data bits on the second output line.

12. A synchronization circuit according to claim 11, characterized in that the frame resynchronization circuit comprises:
    a first p-stage shift register (151-1) into which the data bits from the first output line (21-1) are inputted and shifted under control of the second clock signal (CO), p being an integer number higher than 2,
    a second p-stage shift register (164) into which the resynchronized frame signal is inputted and shifted under control of the second clock signal,
    measuring means (169) responsive to the second frame synchronization signal and to the resynchronized frame signal at the input of the second shift register and to the delayed frame resynchronization signal at the output of each stage of the second shift register to measure the number of the clock pulses of the second clock signal separating the second frame synchronization pulse and the resynchronized frame pulse, at the beginning of each frame; and
    fifth gating means (156) responsive to the measure performed by the measuring means to gate the data bits from the first output line or the delayed data bits at an output of a selected stage of the first shift register on the second output line depending upon the measured number of clock pulses.

13. A frame synchronization circuit arrangement comprising:
    a first circuit means for receiving data bits on a first input line at a first frequency of a first clock signal and for generating delayed data bits from said data bits;

a control means for generating control signals; said control means generating said control signals in response to signals including the first clock signal and a first frame synchronization pulse delimiting frame at the first frequency and a second circuit means responsive to the control signals and operable for correlating the delayed data bits and the data bits to generate output data bits on a second output line (80) at a frequency of a second clock signal in frame delimited by pulses of a second frame synchronization signal.

* * * * *